(12) United States Patent
Winkelmann et al.

(10) Patent No.: US 10,638,654 B2
(45) Date of Patent: May 5, 2020

(54) DEVICE FOR SINGLE-GRAIN SOWING

(71) Applicant: Kverneland AS, Kvernaland (NO)

(72) Inventors: Michael Winkelmann, Soest (DE); Andreas Grafe, Welver (DE)

(73) Assignee: Kverneland AS, Kvernaland (NO)

( * ) Notice: Subject to any disclaimer, the term of this patent is extended or adjusted under 35 U.S.C. 154(b) by 163 days.

(21) Appl. No.: 15/761,845

(22) PCT Filed: Sep. 28, 2016

(86) PCT No.: PCT/EP2016/073083
§ 371 (c)(1),
(2) Date: Mar. 21, 2018

(87) PCT Pub. No.: WO2017/060137
PCT Pub. Date: Apr. 13, 2017

(65) Prior Publication Data
US 2018/0279544 A1 Oct. 4, 2018

(30) Foreign Application Priority Data
Oct. 6, 2015 (EP) .................................... 15188646

(51) Int. Cl.
*A01C 7/04* (2006.01)
(52) U.S. Cl.
CPC ................ *A01C 7/04* (2013.01); *A01C 7/046* (2013.01)

(58) Field of Classification Search
CPC .. A01C 7/04; A01C 7/00; A01C 7/046; A01C 7/042
See application file for complete search history.

(56) References Cited

U.S. PATENT DOCUMENTS

2014/0182494 A1 7/2014 Friestad et al.

FOREIGN PATENT DOCUMENTS

| EP | 1310147 B1 | 6/2005 |
|---|---|---|
| FR | 2591061 A1 | 6/1987 |

OTHER PUBLICATIONS

International Search Report from corresponding International Patent Application No. PCT/EP2016/073083, dated Jan. 3, 2017.

*Primary Examiner* — Christopher J. Novosad
(74) *Attorney, Agent, or Firm* — Kusner & Jaffe

(57) ABSTRACT

A single-grain sowing device comprising: a drum rotatable about an axis of rotation, a cavity formed in the drum, wherein an end face of the cavity is delimited by a sowing disc, in which multiple sowing holes are arranged on a notional circular path at a distance to each other, a body arranged in the cavity, rotatable about an axis arranged at a distance and parallel to the axis of rotation, with one part of the surface thereof resting against the sowing disc such that, when the sowing disc rotates, same temporarily seals a respective passed sowing hole on the inside, wherein the body can be rolled out on an outer casing surface surrounding the cavity, and a pressure spring, wherein the pressure spring presses the body against the casing surface.

14 Claims, 8 Drawing Sheets

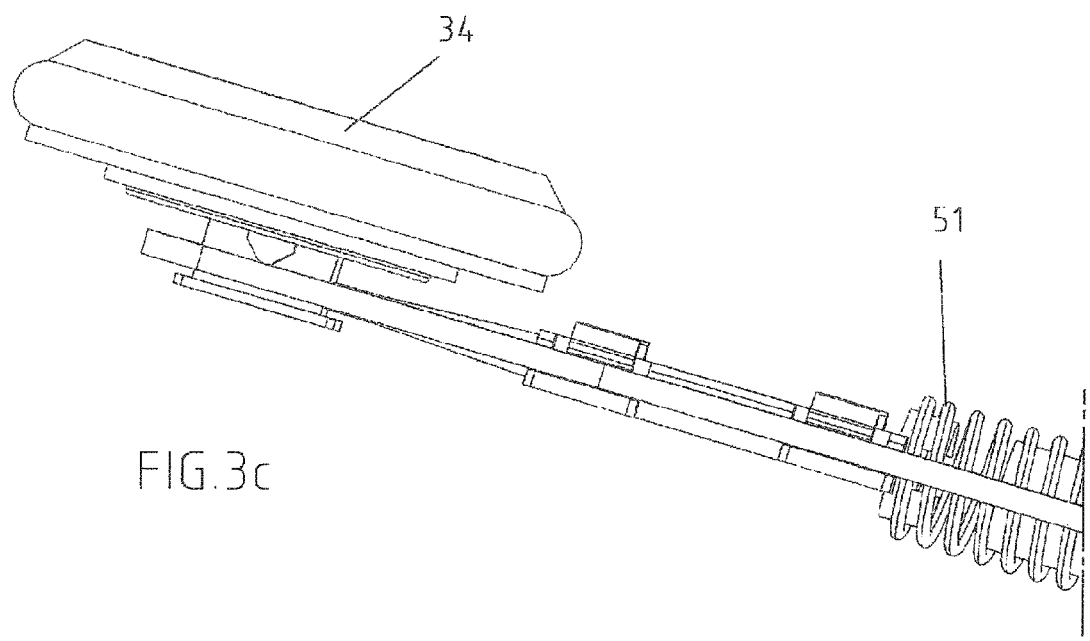
FIG.3c
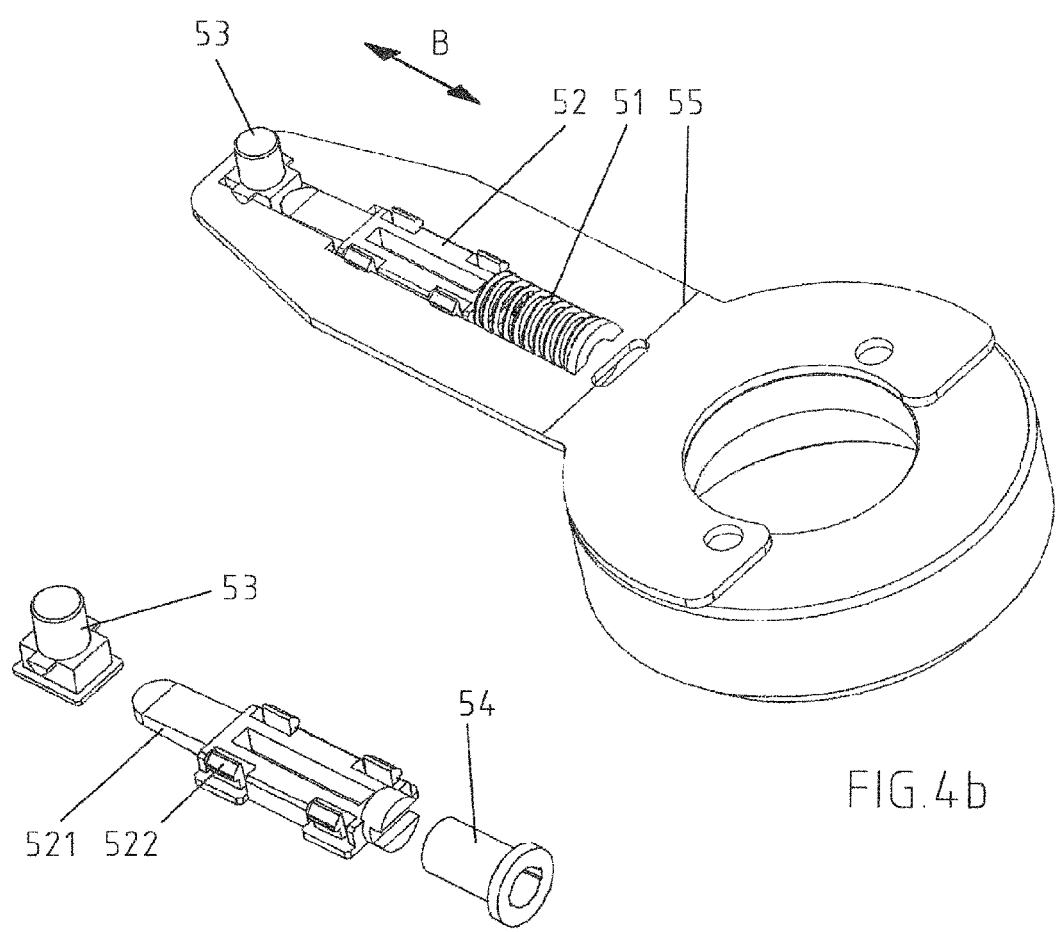
FIG.4b
FIG.4a

DEVICE FOR SINGLE-GRAIN SOWING

FIELD OF THE INVENTION

The present invention relates to a single-grain sowing device (also called single-grain sowing machine) for the scattered delivery of seeds. Such a device is known for example from publication EP 1 310 147 B1.

BACKGROUND OF THE INVENTION

In the case of a device according to the prior art, however, there is the problem that the position of the interrupt body needs to be adjusted exactly in response to the installation of the device, which results in an increased effort in response to the installation. In addition, a readjusting of the interrupt body is required in the prior art.

SUMMARY OF THE INVENTION

It is thus the object of the present invention to provide a single-grain sowing device, which does not have the disadvantages of the prior art and which in particular provides for a simplified installation and which makes a readjusting superfluous. In addition, the functional reliability of the device is to be improved.

This object is solved by means of the single-grain sowing device according to the independent claim(s).

According to the invention, the object is solved by means of a single-grain sowing device, which has:
- a drum, wherein the drum can be rotated about an axis of rotation,
- a cavity formed in the drum, wherein an end face of the cavity is delimited by a sowing disc, in which multiple sowing holes are arranged on a notional circular path at a distance from each other,
- a body, which is arranged in the cavity, wherein the body can be rotated about a further axis of rotation, which is arranged at a distance and parallel to the axis of rotation, wherein the body rests with a part of its surface against the sowing disc in such a way that, when the sowing disc rotates, the body temporarily seals a respective passed sowing hole on the inside, wherein the body can be rolled on an outer jacket surface, which encompasses the cavity,
- a pressure spring, wherein the pressure spring presses the body against the jacket surface.

Advantageous further developments of the invention are specified in the subclaims. All combinations of at least two features, which are disclosed in the description, the claims and/or the figures, also fall within the scope of the invention. If value ranges are specified, values within the mentioned threshold value shall apply as being disclosed as well.

It is in particular the basic idea of the invention to press the body against the jacket surface, so that the body is always optimally positioned and that an improved rolling of the body on the jacket surface can be attained by means of the optimal force transmission. The installation can thus be facilitated significantly, because the position of the body does not need to be provided exactly, but the position of the body adjusts automatically due to the pressure spring.

The directional information "radial" and "axial" hereinbelow refer to the axis of rotation of the drum. The information "outside" and "inside" refer to the radial direction. The information "in front" and "behind" refer to the axial direction.

In the case of smaller foreign objects, such as broken grains, etc., which fall between the jacket surface and the body, the body can also yield to the pressure spring.

The cavity can be capable of being connected to a low pressure source. In the alternative, the cavity can be embodied as exhaust air duct for the overpressure of an overpressure source.

The pressure spring presses the body at least indirectly against the jacket surface, so that at least one further element can be located between the pressure spring and the body.

In a preferred embodiment, the pressure spring located on the inside pushes the body parallel to the radial direction, thus perpendicular to the axial direction, towards the outer jacket surface, so that an optimal force transmission between body and jacket surface occurs in an advantageous manner and so that the rolling of the body on the jacket surface can be improved.

In another preferred embodiment, the pressure spring is arranged on a pressure plate, whereby the pressure spring can be supported and can be protected against a lateral buckling. The pressure spring can in particular be placed onto the pressure plate, wherein the pressure plate is at least partially arranged inside the pressure spring.

In another preferred embodiment, the device has an arm, on which at least the body and the pressure spring are arranged. The body is arranged in particular on an outer end of the arm and, on its inner end, the arm is secured to a shaft, which accommodates the drum. The pressure spring can be arranged between the body and the shaft.

In a preferred embodiment, the arm is embodied as leaf spring. The leaf spring is thereby bent in particular in the direction of the sowing disc, so that the body is pressed onto the sowing disc, in particular in the axial direction. A particularly good coverage of the sowing holes can thus be attained. The leaf spring is bent in particular along a bending line or bending edge, respectively, which runs perpendicular to the radial direction.

In a preferred embodiment, the arm has a coulisse, in which the pressure spring is arranged. This serves in particular for the space-saving design of the device.

The pressure plate is advantageously also arranged inside the coulisse of the arm, wherein the design of the device can be simplified significantly.

In another preferred embodiment, the arm has a movement limitation for the body, which acts in particular in the radial direction. An unwanted displacement of the body can thus be prevented in an advantageous manner. The arm can in particular have a stop for limiting the movement or position, respectively, of the body. The stop can be arranged on the outer end of the arm and can limit the radial movement of the body to the outside. The stop is in particular embodied as radially outer limitation of the coulisse.

In the radial direction, the coulisse in the arm can be embodied symmetrically to the radial direction, whereby the production can be simplified significantly.

The device can furthermore have a sliding carriage, which is movable in particular in the radial direction, for transferring the compressive force of the pressure spring. The pressure spring can thus be arranged on the inside, viewed radially, whereby installation space can be saved. The sliding carriage is in particular arranged between the pressure spring and the body. It can be movably arranged inside the coulisse and can be movably fastened in the coulisse, in particular via one or multiple clips, which are in particular arranged on both sides.

The device can in particular have a further movement limitation for limiting the movement of the sliding carriage. It prevents that the sliding carriage is pushed too far to the outside. It can be embodied as at least one protrusion, in particular in the coulisse. Preferably, two protrusions are arranged as further movement limitation.

In a preferred embodiment, the sliding carriage has a tongue on its end, which is in the front in the radial direction and which is embodied narrower than the rear area of the sliding carriage. The pressure force of the pressure spring can thus be transferred even further to the outside. The narrower tongue is accordingly arranged in a narrower front area of the coulisse, which is located in particular upstream of the further movement limitation for limiting the movement of the sliding carriage.

In another preferred embodiment, the device has a pin, wherein the pin is embodied to accommodate the body or a bearing, respectively, in particular ball bearing, of the body. Due to the pin, the body can be fastened in an improved manner. The pin can be arranged inside the coulisse, in particular in the radially outermost area of the coulisse.

In a preferred embodiment, the sliding carriage can press onto the pin with its front area, in particular its tongue, whereby the pressure force of the pressure spring is transferred efficiently to the pin and thus to the body via the sliding carriage.

In a preferred embodiment, the body is arranged in a rotatable manner with respect to a pendulum axis, which runs perpendicular to the radial direction and perpendicular to the axial direction, in particular parallel to the sowing disc plane. The body can thus attach itself better to the sowing disc. For the rotation about the pendulum axis, the pin can have a pendular protrusion on each side, which bears on the arm or edge, respectively, of the coulisse, so that the pin can swing or rotate, respectively, about the pendulum axis.

In a preferred embodiment, the at least one pendulum protrusion is embodied to be semi-circular to the bottom, thus with the area, which bears on the arm, whereby a simplified tilting is made possible.

The angle of rotation about the pendulum axis is preferred in order to improve the operational safety. The maximum angle of rotation of the body about the pendulum axis is ±500, preferably ±40°, more preferably ±30°, even more preferably ±20°, most preferably ±10°, most preferably of all ±6°. In a preferred embodiment, the pin has a stop for limiting the angle, about which the pin can rotate. The stop can in particular be arranged on an end of the pin, which faces away from the body.

In a preferred embodiment, the pin has, in its middle area above the arm, a base, which is in particular flat, which serves to limit the press-on depth of the body or of the bearing, respectively, of the body onto the pin.

In the upper area of the at least one pendulum protrusion, the latter is preferably embodied so as to be flat and is in particular flush with the base in order to limit the press-on depth. In particular, a single pendulum protrusion is arranged on each side of the pin.

According to another advantageous further development, provision is made for the device to have a dust protection device, wherein the dust protection device contacts the bearing (hereinafter also referred to as mounting) of the body, in particular with an elevated outer annular surface. The dust protection device covers the bearing, in particular the ball bearing of the body. The dust protection device prevents that dust accumulates on the bearing, e.g. on escaping grease, and damages the bearing. The service life of the bearing is thus extended significantly in an advantageous manner.

The dust protection device is preferably made of plastic, whereby the production is simplified, and the weight is reduced. Preferably, it is integrally molded directly to the pin to accommodate the body. This facilitates the installation.

The dust protection device is preferably embodied in an annular manner and its outer diameter substantially corresponds to the outer diameter of the bearing. An elevated outer annular surface of the dust protection device is preferably in contact with an outer annular surface of the bearing. A gap-free dust seal can thus be attained in an advantageous manner. The elevated outer annular surface is low enough that the bearing can still rotate. During operation, the outer annular surface of the bearing thus rotates on the elevated outer annular surface of the dust protection device.

Moreover, the device corresponds to a known single-grain sowing device, as it is described, for example, in the above-mentioned prior art. The features disclosed in publication EP 1 310 147 B1 are hereby expressly added into the disclosure of this invention.

Further features of the invention follow from the features of the subclaims as well as from the other application documents. The invention will be described in more detail below by means of an exemplary embodiment.

BRIEF DESCRIPTION OF THE DRAWINGS

In each case in schematic illustration

FIG. 3*c* shows a side view of the arm comprising the body from FIG. 3*a* or 3*b*, respectively, FIG. 4*a* shows the arm from FIG. 3*a* without body, FIG. 4*b* shows the pressure plate, the sliding carriage, and the pin from FIG. 4*a*.

Identical components, or components with the identical effect are illustrated with identical reference numerals in the figures.

DETAILED DESCRIPTION OF THE INVENTION

Figure 1:
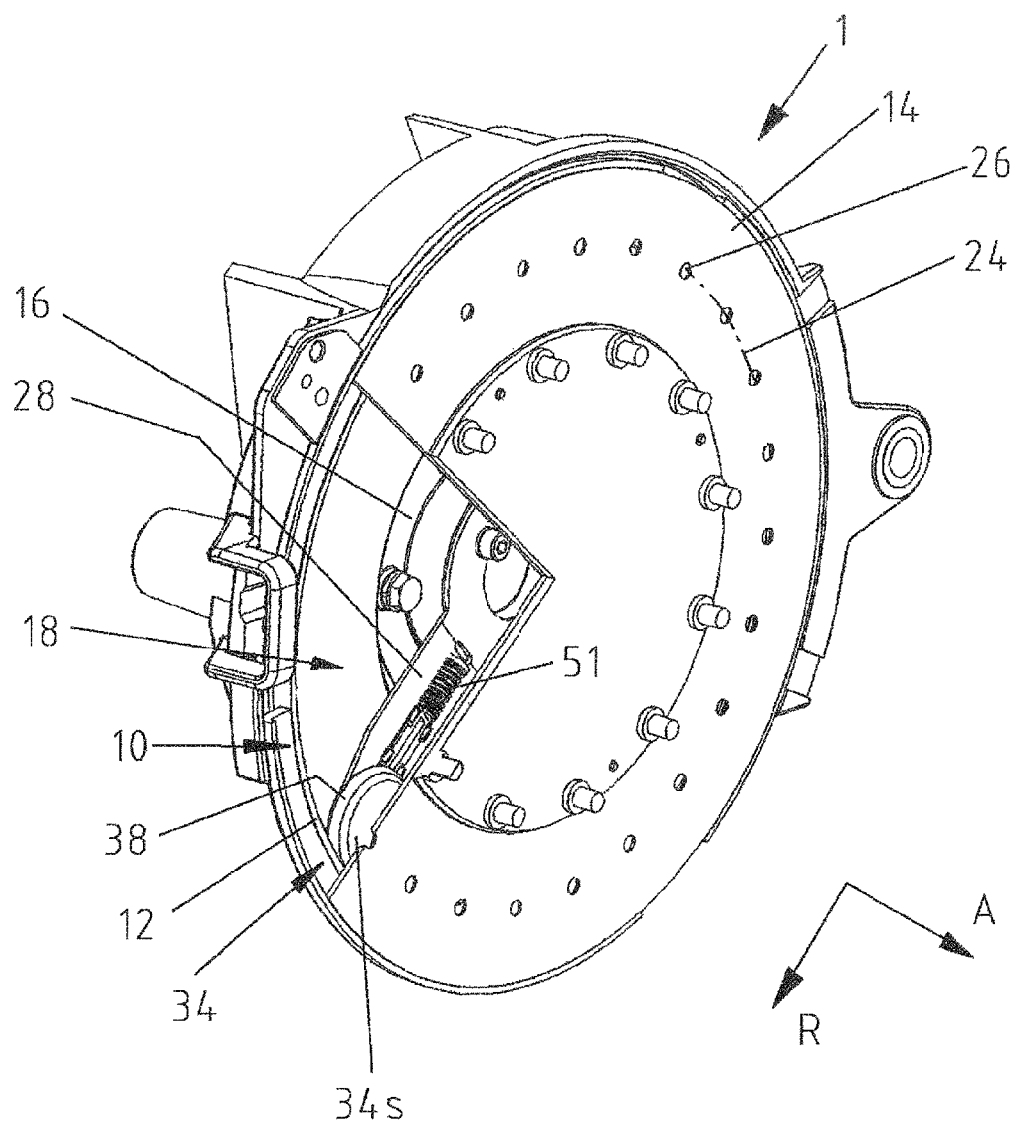
FIG. 1 shows a perspective side view (partially in plan view) of a device according to the invention.
Figure 2:
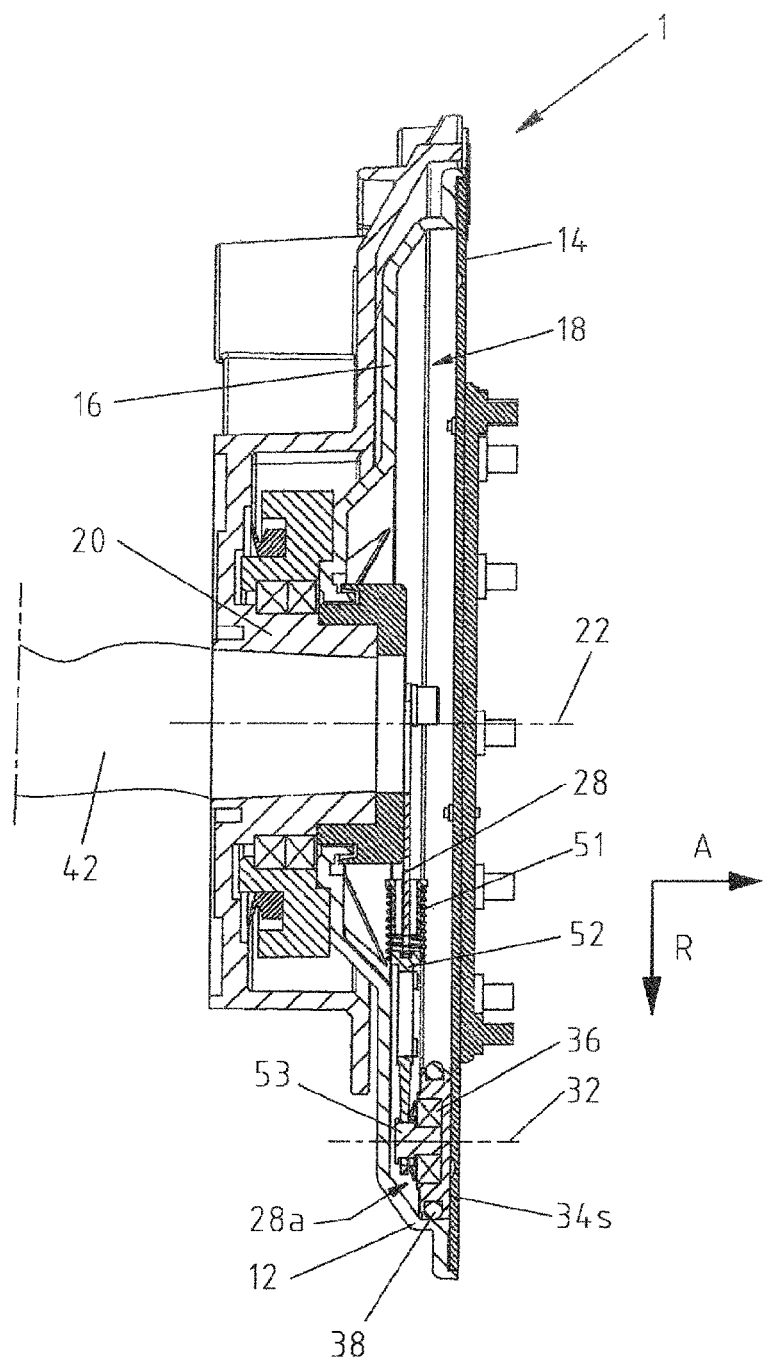
FIG. 2 shows a cross section through the device from FIG. 1.

The device 1 (single-grain sowing device 1) illustrated in FIGS. 1 and 2 substantially comprises a drum-like body (10

(drum 10) comprising an annular peripheral wall 12 (outer jacket surface 12), an end face sowing disc 14, and a rear wall 16, which is located opposite the sowing disc 14, which together encompass a cavity 18.

The drum 10 is rotatably arranged on a shaft 20, the axis of rotation of which (first axis of rotation) bears reference numeral 22 (FIG. 2). The axial direction is identified with arrow A. The radial direction is identified with arrow R.

The guide and mounting of the drum 10 on the shaft 20 is not described in more detail, because they are known per se and are of no significance for the idea of the invention.

As can in particular be gathered from FIG. 1, the sowing disc 14 has a number of sowing holes 26 (also referred to as suction holes), which in each case have an identical distance among one another, on a notional circular line 24 (hereinafter also referred to as circular path 24).

From the shaft 20, a spring arm 28 (leaf spring 28) runs substantially perpendicular to the first axis of rotation 22. The spring arm 28 is secured in a stationary manner in the area of the shaft 20 and supports on its opposite outer end 28e (adjacent to the peripheral wall 12) a pin 53, which runs parallel to the first axis of rotation 22, comprising a second axis of rotation 32, which runs parallel to the first axis of rotation 22 in a corresponding manner, to which a disc-shaped body 34 is mounted via a rotational bearing 36.

A front end face (surface) 34s of the body 34 bears on the sowing disc 14 on the inner side, namely due to the contact pressure of the spring arm 28.

As follows from FIGS. 1 and 2, the body 34 thereby bears on the inner side of the sowing disc 14 in such a way that it covers a corresponding sowing hole 26 and bordering areas of the inner side of the sowing disc.

In the illustrated exemplary embodiment, the second axis of rotation 32 runs slightly offset to the inside as compared to the center point of the sowing holes 26 or of the notional circular path 24, respectively.

On its peripheral surface, the body 34 has an elastic ring 38, which bears on the peripheral wall 12 on the inner side, so that the body 34 rotates about the pin 53 when the drum 10 rotates, namely at a much higher rotational speed than the sowing disc 14.

The body 34 thereby sweeps across an annular strip on the inner side of the sowing disc 14, the width of which corresponds to the diameter of the body 34 in the contact area to the sowing disc 14.

The function of the device is as follows:

A low pressure is generated in the cavity 18 (via a low pressure line 42, which is flanged against the hollow shaft 20). A low pressure, which makes it possible to seize a grain in each case in the area of each sowing hole 26 on the outer side (on the right in FIG. 2), bears on the sowing holes 26 in a corresponding manner, which grain is removed in the known manner via a non-illustrated seed supply.

In the alternative, an operation with overpressure is possible on principle instead of low pressure.

This low pressure is only interrupted in the area of the one sowing hole 26, which is covered on the inner side by the body in the respective position of the sowing disc 14.

Due to the fact that only one sowing hole 26 is in each case covered at a point in time, a constant ejection interval results for the individual seeds at a constant rotational speed of the sowing disc 14, or a constant distance between the seeds, which are placed into a furrow, results at constant speed of the tractor, respectively.

As follows in combination with FIGS. 3a, 3b, 3c, 4a, 4b, 5, the device also has a pressure spring 51, a pressure plate 54, a sliding carriage 52 comprising a tongue 521, and a pin 53. Two clips 522 are in each case laterally arranged on the sliding carriage 52.

As follows in particular from FIG. 6, the pin 53 in each case has one pendulum protrusion 531 on each side. On its lower end, the pin 53 furthermore has a stop 533. In its middle area, the pin 53 furthermore has a base 532, which is embodied so as to be flat. The pendulum axis protrusions 531 are embodied so as to flat to the top and are flush with the base 532. To the bottom, the pendulum axis protrusions 531 are embodied so as to be round.

Figure 8:
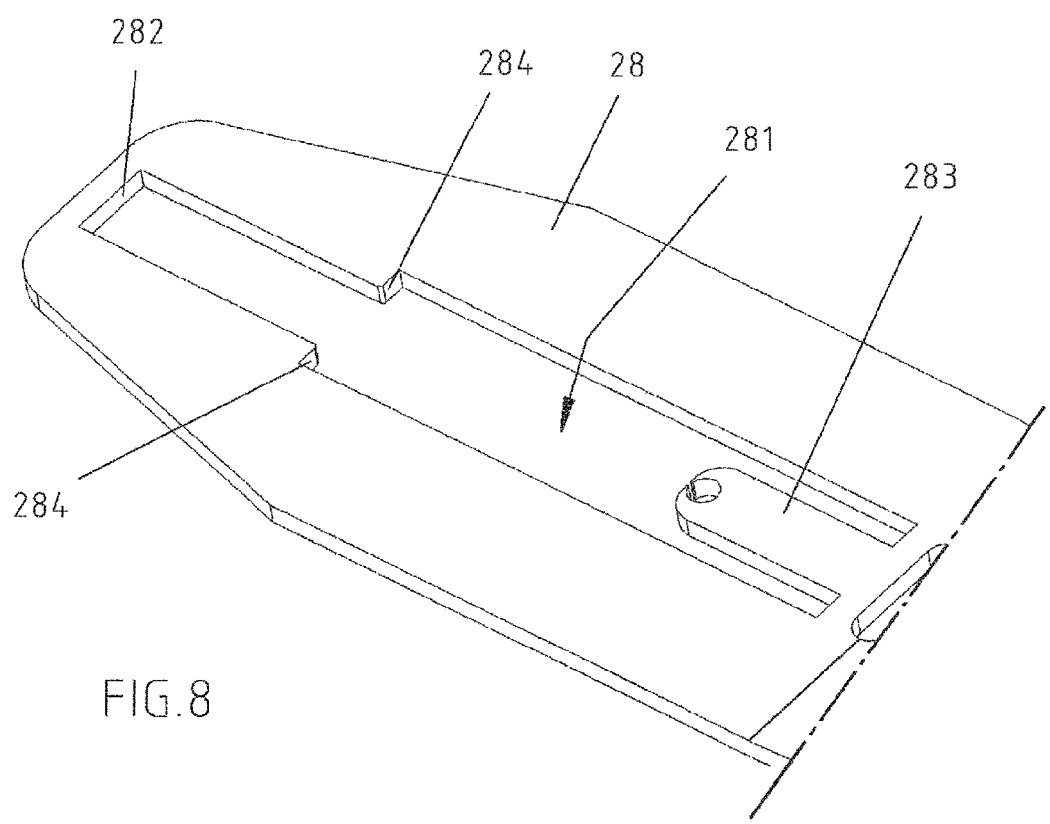
FIG. 8 shows the arm without pressure spring, pressure plate, sliding carriage and pin.

As can in particular be seen in FIG. 8, the spring arm 28 (leaf spring 28) has a coulisse (groove) 281. The coulisse 281 is limited in the radial outward direction by means of an outer stop 282 (depth limitation), which is embodied as stop for the pin 53. Inside the coulisse 281, the arm 28 has an accommodation 283 for the pressure plate 54. In the middle between the accommodation 283 and the outer limitation 282, two protrusions 284 (also called stops) are arranged, which protrude into the interior of the coulisse 281. The protrusions 284 serve to limit the radial movement of the sliding carriage 52. In its outer area, viewed radially, the coulisse 281 is thus embodied to be narrower than the inner area of the coulisse 281 due to the protrusions 284. The pin 53 and the tongue 521 of the sliding carriage 52 is arranged in the outer area of the coulisse 281. The accommodation 283 accommodates the pressure plate 54 in the radial direction. The pressure plate 54 bears with an inner stop in the inner area of the accommodation 283 on the inner end of the coulisse 281. The pressure spring 51 is attached to the pressure plate 54, wherein the pressure spring 51 is longer than the pressure plate 54 and the accommodation 283 in the radial direction.

In its inner end, the sliding carriage 52 has a narrow pin, by means of which the sliding carriage 52 can be inserted into the pressure spring 51. The pressure spring 51 then bears with its front-side end face on the inner end of the sliding carriage 52. The sliding carriage 52 is movably guided inside the coulisse 281 in the radial direction.

For this purpose, the sliding carriage has two clips 522 on each side, which bear on the side walls of the coulisse 281, so that the sliding carriage 52 is guided so as to glide in the coulisse so as to be movable in the radial direction.

The movement of the carriage 52 is limited by the protrusions 284 in the radial direction to the outside. It is thus attained that an unintentional displacement of the displacement carriage and thus also of the body 34 can be prevented.

The tongue 521, which is arranged on the outer end of the carriage 52, extends in the outer narrower area of the coulisse 281. With the outer end of the tongue 521, the sliding carriage 52 bears on the movable pin 53. The sliding carriage is hereby substantially flush with the surface of the arm 28.

The tongue 521 bears on the base 532 of the pin 53 and thus transfers the pressure force of the pressure spring 51, which is transferred to the sliding carriage 52, to the pin 53 and thus also to the body 34.

Figure 6:
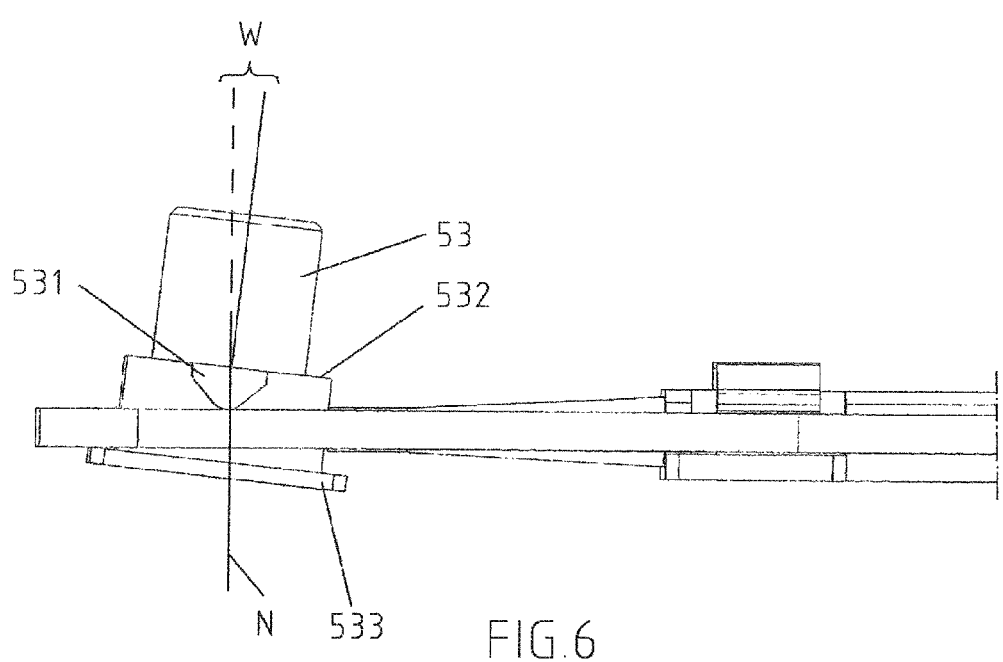
FIG. 6 shows the arm from FIG. 5 in a side view.

FIG. 6 shows in particular that the pin 53 is supported on the arm 28 so as to be capable of being pivoted about a pendulum axis perpendicular to the radial direction by means of the round pendulum protrusions 531. The stop 533 located in the lower area limits this swinging or pivot movement, respectively, to the angular area W with regard to the normal N of the leaf spring 28. It is thus prevented that the pin 53 or the body 34, respectively, can pivot too far.

Figure 7:
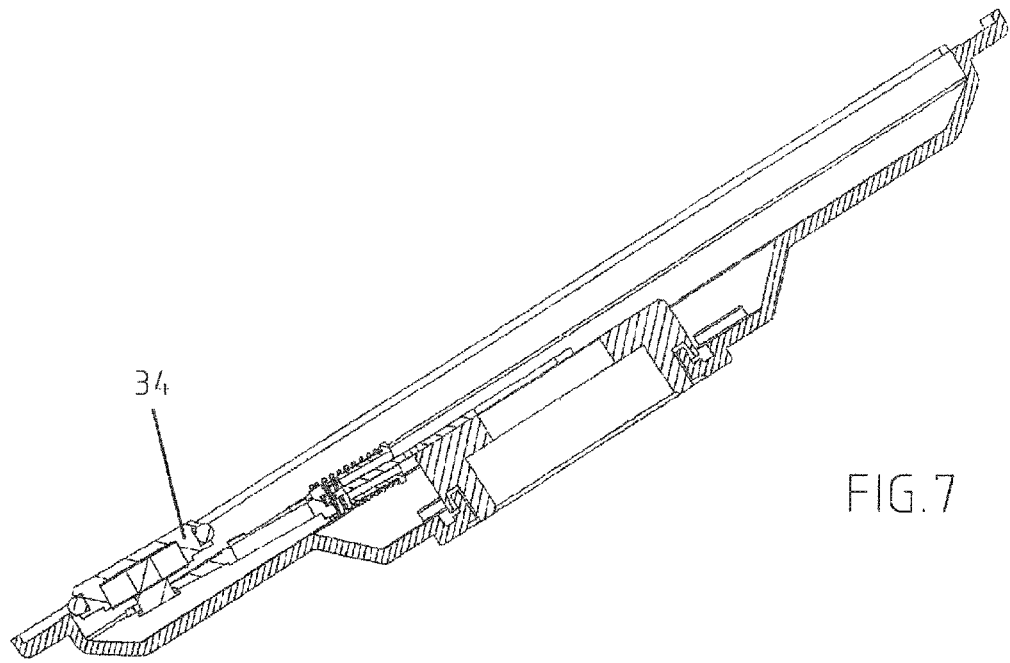
FIG. 7 shows the device according to the invention comprising the body and the arm by omitting the sowing disc.

The leaf spring 28 is bent about a bending edge 55 in the direction of the sowing disc 14, wherein the bending edge runs perpendicular to the radial direction R. The body 34 can thus be pressed against the sowing disc 14 with pressure. FIG. 7 shows the device in the pre-installed or semi-installed state, respectively, without sowing disc 14. In this state, the body 34 protrudes beyond the notional sowing disc plane as a result of the bending of the leaf spring 28.

The mode of operation is now as follows: The pressure spring 51 presses the sliding carriage 52 and the pin 53 radially outwards in the direction of the jacket surface 12, so that the body 34 is pressed onto the jacket surface 12 and rotates safely. The body 34 thus adapts independently on the sowing disc and the jacket surface. An adjustment does not need to be made in response to the installation. The operational safety is increased, and a readjustment is superfluous. The body 34 is in constant rotation, whereby the flat surface of the body 34 cleans independently, so that leaks are not created by dirt or broken grains.

In the case of smaller foreign objects, such as broken grains, etc., which fall between drum and body 34, the body or the pin respectively, escapes radially to the inside. The leaf spring can in particular be made of stainless steel.

The possible movement of the pin 53 or of the sliding carriage 52, respectively, is illustrated in FIG. 4a by means of the double arrow B. The sliding carriage and the pin 53 can thus move outwards in the radial direction or inwards against the radial direction.

Figure 9:
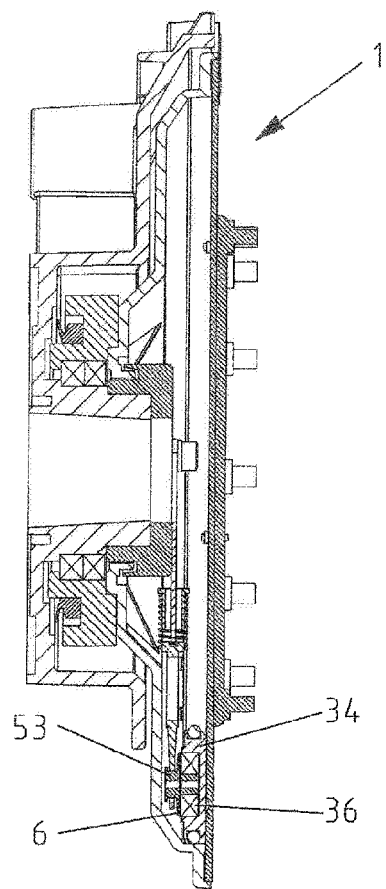
FIG. 9 shows a cross section of a device according to the invention according to another embodiment comprising a dust protection device.

FIG. 9 shows a cross section analogous to FIG. 2 of another embodiment according to the invention, wherein the device 1 has a dust protection device 6. The dust protection device 6 is made of plastic, for example, and is integrally molded directly on the pin 53 in this embodiment.

The dust protection device 6 is embodied in an annular manner and its outer diameter substantially corresponds to the outer diameter of the mounting 36, which supports the body 34 in a rotatable manner. The mounting contacts the dust protection device 6 in such a way that the mounting 36 is rotatable on the dust protection device 6.

The dust protection device 6 protects the mounting 36 against dust and dirt, which could accumulate in particular on grease, which escapes from the mounting.

The remaining parts of the device 1 have already been described in the previous figures, so that reference is made thereto in order to avoid repetitions.

Figure 10:
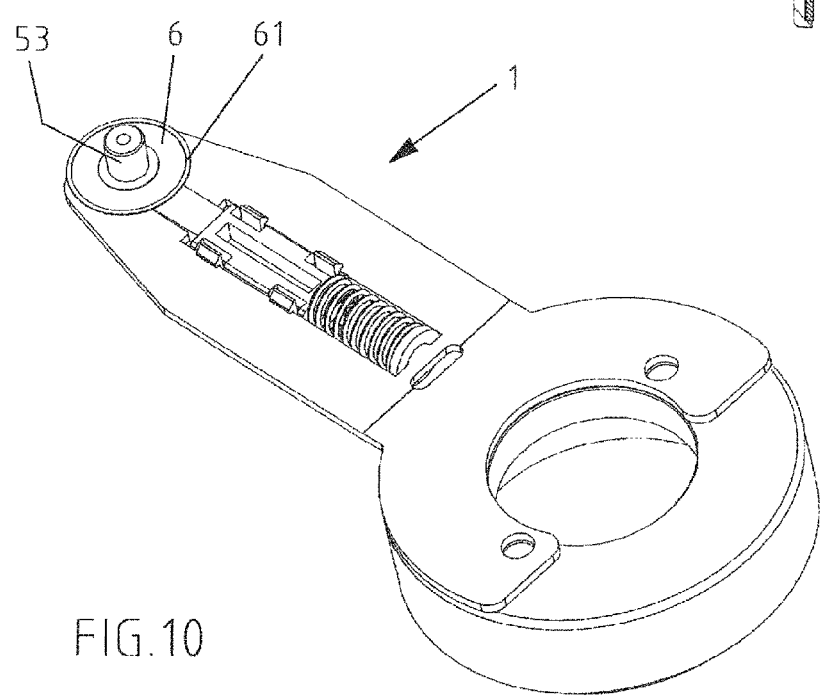
FIG. 10 shows a detailed view in a perspective view of the device from FIG. 9.

FIG. 10 shows the device 1 of FIG. 9 analogous to FIG. 4b, wherein some parts are omitted for the sake of clarity. The dust protection device 6 has an elevated outer annular surface 61, which contacts the mounting 36 and thus ensures an improved dust impermeability. The mounting 36 thus rotates during operation on the elevated outer annular surface 61. The remaining parts of the device 1 have already been described in the previous figures, so that reference is made thereto in order to avoid repetitions.

Figure 3A:
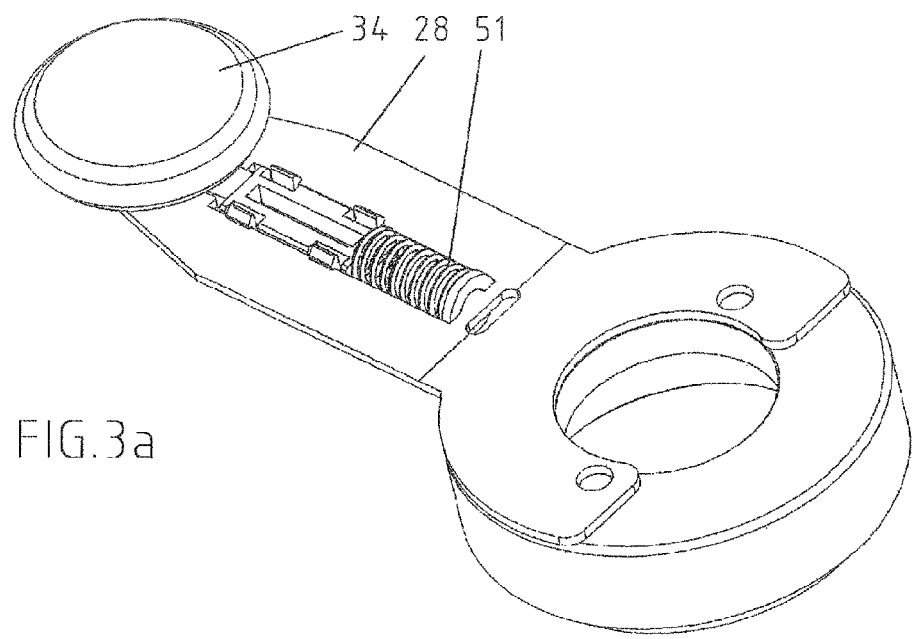
FIG. 3*a* shows an arm comprising a body of the exemplary device according to the invention from FIG. 1 and FIG. 2 in a perspective front view.
Figure 3B:
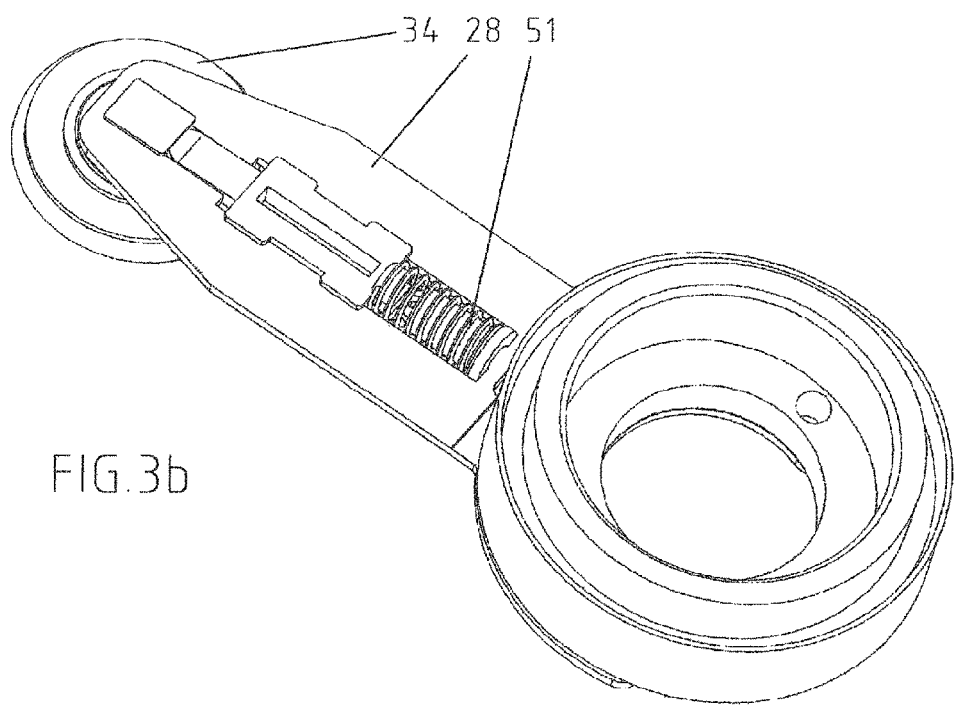
FIG. 3*b* shows a rear view of the arm comprising the body from FIG. 3*a*.
Figure 5:
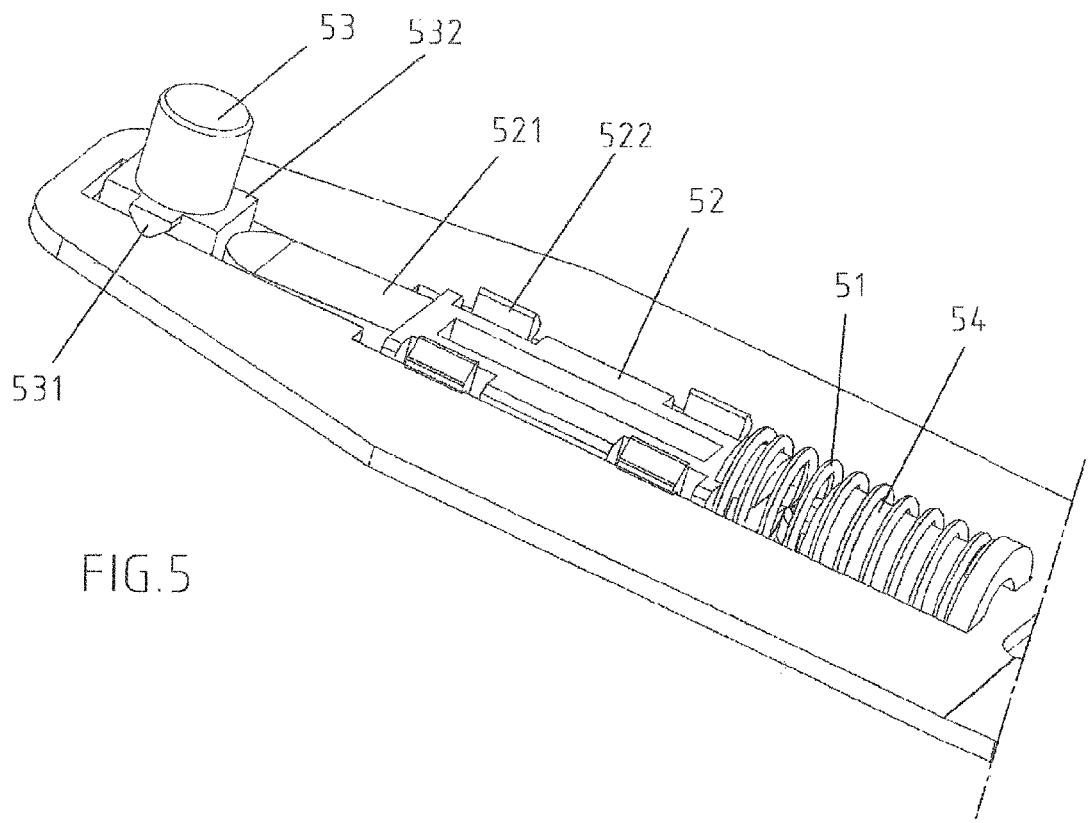
FIG. 5 shows the arm from FIG. 4*a* in an enlarged view.
Figure 11:
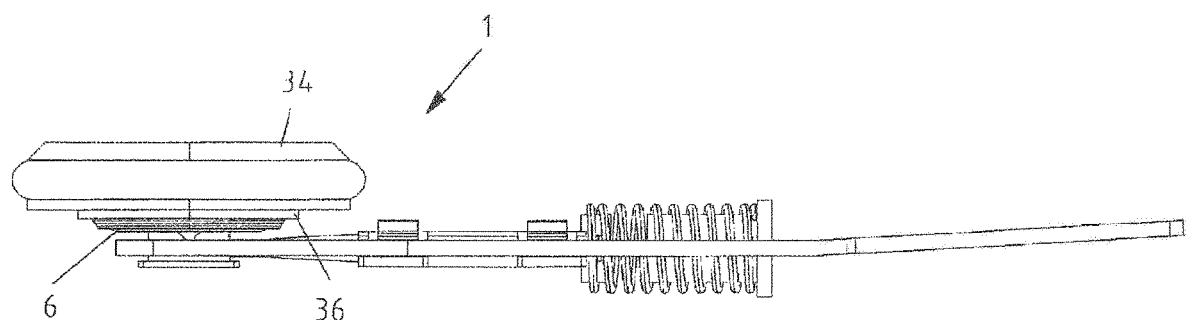
FIG. 11 shows a detailed view in a side view of the device from FIG. 9

FIG. 11 shows the device 1 of FIG. 9 analogous to FIG. 3b, wherein some parts are omitted for a better illustration. FIG. 11 shows the body 34 comprising the mounting 36 installed on the dust protection device 6, wherein the mounting 36 bears on the dust protection device 6 in a rotatable manner.

The remaining parts of the device 1 have already been described in the previous figures, so that reference is made thereto in order to avoid repetitions.

Figure 12:
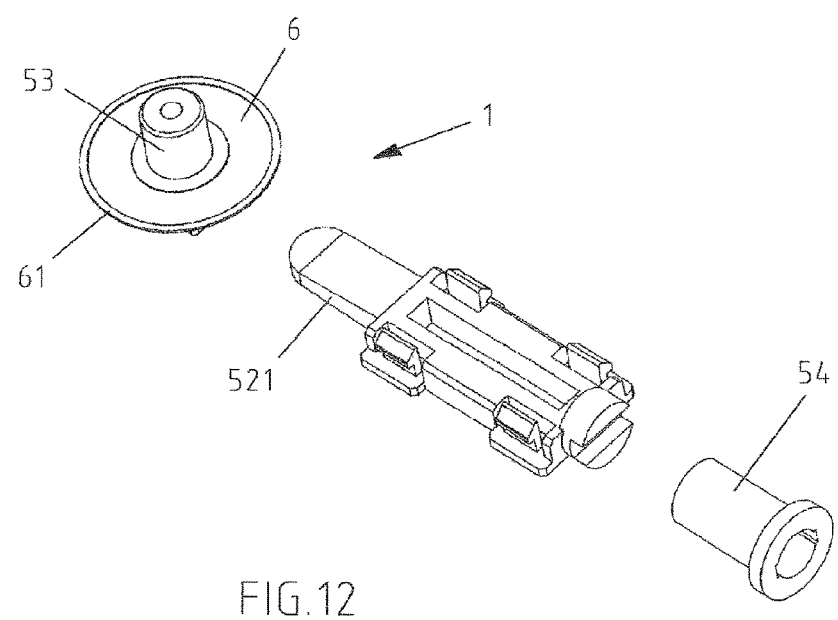
FIG. 12 shows a detailed view in an exploded view of the device from FIG. 9.

FIG. 12 shows the device 1 of FIG. 9 analogous to FIG. 4a in an exploded illustration, whereby some parts, such as the body 34, are not illustrated for the sake of clarity. The dust protection device 6 has the elevated outer annular surface 61, which contacts the mounting 36 and thus ensures an improved dust impermeability. The mounting 36 thus rotates during operation on the elevated outer annular surface 61. The remaining parts of the device 1 have already been described in the previous figures, so that reference is made thereto in order to avoid repetitions.

LIST OF REFERENCE NUMERALS 1 single-grain sowing device
10 drum
12 jacket surface, peripheral wall
14 sowing disc
16 rear wall
18 cavity
20 shaft
22 axis of rotation
24 circular path
26 sowing hole
28 arm
28e outer end of the arm
32 second axis of rotation
34 body
34s surface of the body
36 mounting
38 ring
42 low pressure line
51 pressure spring
52 sliding carriage
521 tongue
522 clips
53 pin
531 pendulum protrusion
532 base
533 stop
54 pressure plate
55 bending edge
281 coulisse
282 stop
283 accommodation for pressure plate
284 stop
A axial direction
B direction of movement
W angular area
N normal
R radial direction
6 dust protection device
61 elevated outer annular surface Having described the invention, the following is claimed:

1. A device for the scattered delivery of seeds, comprising:
a drum rotatable about a first axis of rotation, the drum comprising an outer jacket surface, a sowing disc, and a rear wall located opposite the sowing disc, the drum having a cavity that is encompassed by the outer jacket surface, the sowing disc, and the rear wall, the cavity having an end face that is delimited by the sowing disc, the sowing disc having multiple sowing holes arranged therethrough at a distance from each other on a notional circular path;
a body arranged in the cavity, the body being rotatable about a second axis of rotation that is arranged at a distance from and parallel to the first axis of rotation, said body having a front end surface, a part of the front end surface resting against the sowing disc, the body being configured to temporarily seal a passed one of the sowing holes on an inside thereof when the sowing disc rotates the body being rollable on the outer jacket surface; and a pressure spring configured to press the body against the outer jacket surface in a radial direction with respect to the first axis of rotation.

2. The device according to claim 1, wherein the pressure spring is arranged on a pressure plate.

3. The device according to claim 1, wherein the drum is rotatably arranged on and accommodated by a shaft corresponding with the first axis of rotation, wherein the pressure spring is arranged in a coulisse of an arm, wherein the body is arranged on an outer end of the arm, and wherein an inner end of the arm is secured to the shaft.

4. The device according to claim 3, further comprising:
a pressure plate arranged in the coulisse of the arm.

5. The device according to claim 3, wherein the arm has an outer stop for limiting movement of the body.

6. The device according to claim 3, wherein the arm is a leaf spring, which is bent in a direction of the sowing disc.

7. The device according to claim 3, wherein a sliding carriage is arranged in the coulisse, on which the pressure spring presses.

8. The device according to claim 7, wherein the sliding carriage has clips for movable arrangement in the coulisse.

9. The device according to claim 7, wherein the sliding carriage has a tongue on its outer end, and wherein the tongue is narrower than an inner part of the sliding carriage.

10. The device according to claim 3, wherein a pin for accommodating the body is arranged in an outer area of the coulisse.

11. The device according to claim 10, wherein the sliding carriage presses on the pin.

12. The device according to claim 10, wherein the pin can be rotated about a pendulum axis perpendicular to a radial direction (R).

13. The device according to claim 12, wherein the pin has a stop for limiting the rotation thereof about the pendulum axis.

14. The device according to claim 1, further comprising:
a dust protection device that contacts a mounting of the body with an elevated outer annular surface.

* * * * *